US012623379B2

(12) United States Patent
Farinon et al.

(10) Patent No.: US 12,623,379 B2
(45) Date of Patent: May 12, 2026

(54) METHOD FOR PRODUCING A LINING PART FOR A VEHICLE, AND LINING PART PRODUCED USING SAID METHOD

(71) Applicant: ASCORIUM GmbH, Königswinter (DE)

(72) Inventors: Rudi Farinon, Wetteren (BE); Geert Trossaert, Wetteren (BE); Koen Vanlandschoot, Wetteren (BE); Yvan Vanluchene, Waregem (BE)

(73) Assignee: ASCORIUM GMBH, Königswinter (DE)

( * ) Notice: Subject to any disclaimer, the term of this patent is extended or adjusted under 35 U.S.C. 154(b) by 276 days.

(21) Appl. No.: 18/560,957

(22) PCT Filed: May 18, 2022

(86) PCT No.: PCT/EP2022/063388
§ 371 (c)(1),
(2) Date: May 30, 2024

(87) PCT Pub. No.: WO2022/268414
PCT Pub. Date: Dec. 29, 2022

(65) Prior Publication Data
US 2024/0416563 A1 Dec. 19, 2024

(30) Foreign Application Priority Data

Jun. 25, 2021 (DE) ..................... 10 2021 116 451.6

(51) Int. Cl.
*B29C 44/14* (2006.01)
*B29C 44/12* (2006.01)
(Continued)

(52) U.S. Cl.
CPC .......... *B29C 44/14* (2013.01); *B29C 44/1233* (2013.01); *B29C 44/367* (2013.01); *B29K 2275/00* (2013.01); *B29L 2031/3005* (2013.01)

(58) Field of Classification Search
CPC .............. B29C 44/367; B29C 44/1238; B29C 44/1233; B29C 44/206; B29C 44/20;
(Continued)

(56) References Cited

FOREIGN PATENT DOCUMENTS

DE 1510322 * 8/2003
DE 102005052344 A1 5/2006
(Continued)

OTHER PUBLICATIONS

International Search Report dated Dec. 28, 2022 in parent International application PCT/EP2022/063388.
(Continued)

*Primary Examiner* — Stella K Yi
(74) *Attorney, Agent, or Firm* — Polson Intellectual Property Law P.C.; Margaret Polson; Christopher Sylvain

(57) ABSTRACT

In a method for producing a lining part, in particular for the interior of a vehicle, a support substrate is positioned opposite a flexible decorative layer with the interposition of a foam coating, and the support substrate is adhesively connected thereto, wherein the raw foam compound used to form the foam layer is foamed using a gas as a physical blowing agent and is applied onto the rear face of the decorative layer and/or the support substrate face facing the decorative layer in the form of an expanded foam. As long as the expanded foam coating is still flowable, the support substrate is positioned at a defined distance to the rear face of the decorative layer with the interposition of the expanded foam coating so that the decorative layer is connected to the support substrate by the foam coating and is held until the cross-linking process of the foam coating has at least mostly
(Continued)

concluded, wherein a part of the foam layer which fills the original distance between the decorative layer and the support substrate is displaced and plastically compressed at least in some regions by the support substrate during the process of positioning same.

20 Claims, 5 Drawing Sheets

(51) Int. Cl.
      *B29C 44/36*          (2006.01)
      *B29K 275/00*        (2006.01)
      *B29L 31/30*          (2006.01)
(58) Field of Classification Search
      CPC ..... B29C 44/16; B29C 44/148; B29C 44/143;
                                                    B29C 44/14
      See application file for complete search history.

(56)                    References Cited

FOREIGN PATENT DOCUMENTS

DE          102008044026        *    5/2010
DE          202008017784  U1        7/2010
DE          102010023034  A1      12/2011
DE          102011005343  A1        9/2012
DE          102015201898  A1        8/2016
JP                  4258135        *    4/2009

OTHER PUBLICATIONS

International Preliminary Report on Patentability, chapter II, dated Dec. 25, 2023 in parent International application PCT/EP2022/063388.

* cited by examiner

METHOD FOR PRODUCING A LINING PART FOR A VEHICLE, AND LINING PART PRODUCED USING SAID METHOD

BACKGROUND

The disclosure relates to a method for producing a lining part, in particular for the interior of a vehicle, wherein a support substrate is positioned opposite a flexible decorative layer with the interposition of a foam coating and the support substrate is adhesively connected thereto. Also described is an interior lining part produced using this method, wherein the raw compound used to form the foam layer, foamed with a gas as a physical blowing agent, is applied to the rear face of the decorative layer and/or the side of the support substrate facing the decorative layer as a reactive expanded foam raw compound.

Such lining parts are found as interior lining parts in motor vehicles, for example, in the form of instrument panel covers, door panels, glove compartments and the like. Such lining parts are also used outdoors on boats, for example. Such lining parts include a rigid support substrate, which is attached to the vehicle chassis. The support substrate can be used to support installation or attachment parts, for example electrical/electronic units. Such a support substrate is typically a plastic injection molded part made of PP or ABS. The visible side of such an interior lining part is formed by a decorative layer. The decorative layer is flexible and can also have elastic properties, especially if it is a plastic layer, for example made of polyurethane. In order to provide the lining part with a so-called soft-touch property, there is an elastic soft foam layer between the decorative layer and the support layer. Generally, the thickness of such a foam layer is only a few millimeters, typically 3 to 8 mm. The feel provided by the foam layer, and therefore its hardness, is largely defined by the choice of the foam raw compound, the degree of expansion thereof and the density of the foam layer.

In a classic back-foaming process to produce such a lining part, the decorative layer is inserted into an open, multi-part mold or created on one half of the mold by injecting a plastic compound. A reactive foam-forming raw compound is then applied to the back of the decorative layer. The mold is then closed, with the other half of the tool carrying the support substrate. In the closed form, a predefined gap is left between the support substrate and the decorative layer. The reactive foam-forming raw compound contains a chemical blowing agent. This is typically water. As a result of the reaction that takes place between the components that form the foam—in the case of polyurethane these are the polyol and isocyanate components—the raw compound is polymerized and at the same time foamed due to an isocyanate-water reaction that releases gas. At the end of the cross-linking process, the foam layer is formed between the decorative layer and the support substrate. At the same time, the cross-linking process is used so that the foam is adhesively bonded to both the decorative layer and the support substrate. Adhesion promoters can support the adhesive bonding of the foam layer to the decorative layer and the support substrate. Soft polyurethane foams with densities between 150-200 kg/m$^3$ are typically used to form such foam layers, for example for a vehicle interior lining part.

What should be taken into account with this manufacturing process is that quite high pressures and temperatures are sometimes generated within the mold during chemical foaming and the accompanying polymerization. This not only places high demands on the molds or mold parts used for these purposes. It should also be noted that the decorative layer must have a quality that can withstand these influences, in particular the temperatures, even if there may be different temperature distributions in the mold. The latter must not result in a different appearance depending on the temperature on the visible side of the decorative layer. If materials that have openings are used as decorative layers in this process, foam breakthroughs can occur due to the pressures of 2-5 bar in such a mold, where foam is pressed onto the visible side of the decorative layer. Therefore, when using such materials to provide the decorative layer, it is sometimes necessary to carry out complex sealing measures before applying the reactive, not yet expanded raw compound.

DE 10 2011 005 343 A1 relates a method for producing such a lining part in an open mold. This process uses a low-energy foam system, i.e. a foam system that does not cause any major pressures. The physical state of the reactive foam raw compound applied to the rear face of the decorative layer is selected so that it does not flow after coating. This is done in view of the fact that the foam raw compound does not penetrate into openings in the decorative layer. If a connection of the support substrate is desired without additional adhesion promoters or other adhesives, it can be pressed into the surface of the foam raw compound when the foaming process has ended or at least substantially ended. However, at the time of assembly of the support substrate, the so-called tack-free period of the foam mass must not yet have been reached. Finally, the surface of the foam must still be sticky enough to enable the desired adhesive bond.

DE 20 2008 017 784U1 relates an interior lining part with absorbent decorative material. According to the method described therein for producing such an interior lining part, a partially physically expanded foam raw compound is applied. As is known, this contains a chemical blowing agent. In order to allow foam to be applied to an absorbent decorative material without it breaking through, it is provided that after application of the foam raw compound some time is waited until the viscosity is sufficiently high due to an already advanced cross-linking process, so that the foam raw compound cannot be pressed through the decorative layers when attaching the support substrate. In this respect, the method described in this prior art does not differ from the method described in DE 10 2011 005 343 A1.

Even if back-foaming of decorative layers having openings is possible with this previously known method, the time window in which the support substrate is pressed into the not yet completely cross-linked foam surface must be adjusted and maintained very precisely. Finally, the applied foam-forming raw compound should be almost completely foamed before the support substrate is brought into contact with it. On the other hand, the foam's tack-free time, i.e. the time at which the foam is no longer sticky, must not yet have been reached. This time window is usually only a few seconds. If the support substrate is pressed into the expanded, almost completely polymerized foam, the foam is compressed. The latter leads to a different hardness over the flat extent of the interior lining part and thus a different haptic over the flat extent if the distance between the rear face of the decorative layer and the support substrate and thus the thickness of the foam layer is not uniform over the flat extent of the inner lining part. Then the hardness of the foam layer is greater in those areas of the interior lining part in which the distance between the decorative layer and the support substrate is smaller. This applies in particular to support substrates that cannot be provided at a uniform distance from the decorative layer due to other requirements placed on them. If at all, this can only be compensated for in a very inadequate manner by applying the foam-forming raw compound with different thicknesses.

SUMMARY

Proceeding from this background, one aspect of the disclosure is therefore to propose a method for producing an interior lining part which has a soft-elastic foam layer between a decorative layer and a support substrate, with which the disadvantages mentioned above are avoided and, moreover, the design freedom for configuring such an interior lining part is less restricted. Furthermore, it would be desirable if the manufacturing method could be simplified and, in particular, shortened in time.

This is achieved by a method of the type mentioned at the beginning, in which, as long as the expanded foam coating is still flowable, the support substrate is positioned at a defined distance from the rear face of the decorative layer with the interposition of the expanded foam coating, so that the decorative layer is connected to the support substrate by the foam coating, and is held until the cross-linking process of the foam coating is at least largely completed, whereby during the process of positioning the support substrate, at least a part of the foam layer filling the original distance between the decorative layer and the support substrate is displaced and plastically compressed by the support substrate.

In this process, the foam raw compound is already foamed and applied in an expanded form, either on the rear face of the decorative layer, or on the side of the support substrate facing the decorative layer, or on both the decorative layer and the support substrate. Since the foam raw compound is already applied in its foamed state, two such foam coating layers can also be applied, applied to the rear face of the decorative layer and to the side of the support substrate facing the decorative layer, and still provide a homogeneous foam layer as a result. A physical blowing agent is used as the blowing agent, namely a gas, for example carbon dioxide or nitrogen. It goes without saying that another suitable gas can also be used as a blowing agent. In contrast to conventional methods in which the raw compound is foamed with chemical blowing agents, foaming is not provided by a chemical reaction within the applied raw compound. The foam coating is open-pored. A combination of this already expanded foam coating with other foam coatings and/or foam layers is also possible, for example if a first foam coating is applied to the rear face of the decorative layer, for example as an open-pore foam coating, as described above, and a second foam coating is applied to the side of the support substrate facing the decorative layer as a closed-cell foam coating or has been connected to the support substrate by another method. Such a combination can also be carried out in such a way that the decorative layer is coated on the rear face with a foam layer in a first step before the expanded foam coating according to the disclosure is applied. In order to keep the carbon dioxide footprint low when producing such a lining part, it is preferred not to use carbon dioxide as the gaseous blowing agent, but instead, for example, nitrogen.

Since the foam coating is already applied in an expanded form, the support substrate can be positioned relative to the decorative layer immediately after the expanded foam coating has been applied. When foam is applied to the rear face of the decorative layer, this means that the support substrate is brought into contact with the expanded foam applied thereon. Regardless of whether the foam coating is applied to the decorative layer and/or the support substrate, in contrast to previously known methods, it is not necessary to wait for the time required for chemical foaming in order to be able to position the support substrate. In known methods for positioning the support substrate, it is also necessary to wait until the cells formed by the foaming process have burst open so that an open-pore foam coating is formed. In conventional methods, a too early positioning of the support substrate is therefore also determined by the time at which the open-pore foam is formed.

Since in the disclosed method, the foam coating has only just begun to polymerize at the time of positioning the support substrate in relation to the decorative layer with the interposition of the foam coating, the foam coating is still at least flowable to a certain extent and can be easily displaced. This is done by positioning and setting up the support substrate relative to the decorative layer. Then wait until the cross-linking process is at least largely completed before removing the lining part from the mold. Displacing expanded foam coating brings numerous advantages. In this way, for example, an evening out of the expanded foam coating, which is typically applied by spraying, is possible within the mold gap between the decorative layer and the support substrate, as well as the displacement from the mold gap of expanded foam coating that is not required to fill this gap. What is of interest for the lining part to be produced in this context is that the lining part is backed with uniform hardness, regardless of the material thickness of the foam layer between the decorative layer and the support substrate, even if the gap width varies. This does not produce undesirable foam compression, at least not to a noticeable extent. A foam compression of 5-30%, preferably 10-20%, in particular 10-15% is taken into account in the formation of the foam layer and is therefore not undesirable.

A key aspect of this method is that the time interval in which the support substrate is to be positioned relative to the decorative layer, for example in the case of a foam coating on the rear face of the decorative layer, such that the support substrate is brought into contact with the foam coating for adhesive bonding, is significantly longer. This means that not only is the manufacturing method shortened because there is no need to wait, as is the case when using chemical blowing agents, but that a method that is less susceptible to long-term non-reproducibility is also provided. By using catalysts in the reactive foam raw compound, the reaction time—the time required until the polymerization process is completed—can be significantly shortened, so that the production of such a lining part can be shortened again in this regard. If chemical blowing agents are used, the cross-linking process should only begin once the expansion process has been completed. If, in the method according to the disclosure, for example, the rear face of the decorative layer is provided with the expanded foam coating, the support substrate is typically brought into contact in the time window of the reaction time after 70% of the reaction time has not yet been reached. The same applies in the case of a coating of the support substrate or in the case of a foam coating on the decorative layer and the support substrate. A particularly preferred embodiment is in which the support substrate is positioned when 50% of the reaction time has not yet expired. The earlier the support substrate is positioned relative to the decorative layer with the foam coating interposed, so that the foam coating contacts both the decorative layer and the support substrate, the better the adhesive bond. Due to this early positioning of the support substrate relative to the decorative layer with the expanded foam coating therebetween compared to the prior art, the polymerization process has not yet progressed such that foam movement occurs without damaging the foam structure. This is cleverly used in the subject matter of the disclosure.

The relatively large time window for positioning the support substrate also allows the production of larger lining parts in which the application of the expanded foam, typically by spraying, requires some time, without accepting any disadvantages with regard to positioning the support substrate relative to the decorative layer in terms of the foam quality or an adhesive bond between the foam coating on the decorative layer and the support substrate.

The possibility of displacing part of the expanded foam coating through the support substrate allows the process to be carried out to form the foam coating with a greater thickness than actually required, and therefore to carry out the foam coating with a larger volume than required. This is also the case in one preferred example embodiment. The distance between the decorative layer and the support substrate can be provided via spacer elements, for example spacer pins, for example as part of the support substrate or integrated into the mold. The use of a positioning caliber is also entirely possible. The displacement of a certain amount of expanded foam coating and thus the modeling or distribution of the foam coating by the support substrate through a relative movement between the support substrate and the decorative layer leads to a foam that is homogeneous in terms of its compression in the space between the decorative layer and the support substrate with constant foam quality.

In this method, due to the flowable property of the expanded foam coating at the time of positioning the support substrate relative to the decorative layer, this property can be used to introduce foam into undercuts in the support substrate, which has the advantage that the polymerized foam layer is then not only bonded to the support substrate in an adhesive manner, but also provided by positive locking. This is especially true if the foam is applied to the rear face of the decorative layer and not to the support substrate. Simply pressing the support substrate into the expanded foam coating presses it into undercut structures present on the support substrate on its side facing the foam coating. To support such a foam coating engaging in undercut structures of the support substrate on its side facing the decorative layer, the support substrate can also be moved in the plane of the decorative layer, floating on the foam coating. The term flowability used in these explanations with regard to the foam coating after polymerization has begun does not necessarily mean that the foam has to flow solely due to gravity, but in particular that it can be modeled and can therefore be moved without any significant change in its consistency. Some compression is possible.

Excess foam coating can be pushed out laterally from the space between the decorative layer and the support substrate and, for example, cut off after the cross-linking process of the foam coating has been completed. In order to avoid excessive pressing out of the expanded foam coating in such an embodiment of the method, when applying the expanded foam coating in the peripheral edge region of the decorative layer or also all around the engagement openings made therein, the foam can be applied with a smaller thickness or with a thickness which decreases towards the edge or the engagement opening. According to another embodiment, it is provided that the mold and/or the support substrate has openings or channels at the edges through which the foam displaced by the positioning of the support substrate can escape from the gap between the decorative layer and the support substrate. It is also possible that, if the foam coating is not to be displaced from the space between the decorative layer and the support substrate or not completely in response to the pressing in of the support substrate, the foam coating is compressed by the pressing in of the support substrate. Compressing the foam coating is desirable if the density of the foam is also to be influenced. This is possible with the method described because open-pore expanded foam has been applied to form the foam coating, since the gas contained in the foam cells can be pressed from one cell into the next and thus also out of the foam coating. This measure plastically compresses the foam coating. In the event that foam escaping from the space between the decorative layer and the support substrate is not desired, this space can be sealed at the edge.

Another particular advantage of this method is that the foam can be applied by spraying due to the desired flowability. This is provided in a preferred embodiment, wherein the spray application is carried out with a small droplet size, whereby the application thickness of the expanded foam coating can be particularly well controlled.

As a result of the application of an already foamed foam coating, no additional temperature is introduced into the composite to be created. Typically, conventional methods using a chemical blowing agent use water as the chemical blowing agent. The reaction in this regard is exothermic. Since no exothermic reaction is required for foaming in the disclosed foaming method, no shrinkage phenomena need to be taken into account or accepted. In addition, cell opening agents are not required as additives in the foam raw compound in the disclosed process.

This production of a lining part takes place without pressure. The application pressure is generally less than 1 bar, preferably even less than 0.5 bar.

Furthermore, the polymerization can be carried out at low temperatures, at least at temperatures at which the decorative layer is not adversely affected.

The layer thickness of the foam layer produced in this way can be 15 mm to 20 mm, in particular up to 10 mm, in particular up to 5 mm. Differences in thickness in the space between the decorative layer and the support substrate can occur due to the plastic modeling ability of the foam coating.

The density of the foam coating can be freely selected and can be, for example, between 70 and 700 $kg/m^3$, in particular between 200 and 500 $kg/m^3$. Typically, the positioning of the support substrate relative to the decorative layer is accompanied by a certain compression of the foam coating. The density of the foam coating can be increased by, for example, by 5%-30%.

Preferred densities of the foam coating are approximately 250 $kg/m^3$, wherein the positioning of the support substrate, which is accompanied by a compression of the foam coating, leads to an increase in the density to, for example, 300 $kg/m^3$.

In this process, the space between the decorative layer and the support substrate forms the mold within which the foam coating polymerizes and thus obtains its desired shape.

The foam layer formed from the foam coating after polymerization has been completed can be designed as a soft foam layer or as a semi-rigid foam layer, depending on the desired requirements.

Typically, the support substrate is positioned on the expanded foam coating immediately after the expanded foam coating has been applied. Since the polymerization begins when the reactive components are mixed—in the case of polyurethane: polyol and isocyanate—the polymerization and thus the reaction period have already begun at this point. However, as already shown above, this does not affect the displacement of foam by the support substrate.

Even if the method described above can in principle be carried out in a closed mold without pressure and without exothermic heating, for the sake of simplicity the method is typically carried out in an open mold.

In a preferred embodiment, an anhydrous foam raw compound is spray-applied with a gaseous blowing agent.

Even if the application of an anhydrous expanded foam coating is provided in the example embodiment described above, it is possible that a chemical blowing agent can also be contained to a certain extent in the foam coating in order to achieve certain effects.

The foam layer of the lining part produced is typically a polyurethane foam. The mixing of gas can be carried out before or during the mixing of the polyol component with the isocyanate component. It is also possible to provide one of the two components with gas before mixing. In a spray application, gas, typically nitrogen, is added to the reactive mixture in the mixing chamber. The actual volume increase occurs at the exit of the application nozzle, so that the expanded foam is applied to the rear face of the decorative layer. A spraying process is described in WO 2007/127623 A1. The statements relating to spray application in this prior art, even if carried out in a different context, are hereby made the subject of these statements by this explicit reference. It goes without saying that other polymerizing foams can also be used to form the foam layer of the lining part.

The decorative layer can ultimately be any flexible film-like layer, such as a thermoplastic film, one made of polyurethane, PVC, TPO, fabric, leather, artificial leather or the like. Pressure- and temperature-sensitive materials can also be easily used, as neither pressures nor higher temperatures are generated in this process. Such a decorative layer can also have openings. Foam breakthroughs that adhere to the visible side of the decorative layer are not to be feared due to the lack of pressure when applying the foam.

As is the case with conventional methods, the support substrate can be made, for example, of PP or ABS plastic parts. These can have openings, which is not a problem due to the pressure-less application and polymerization. In fact, the foam coating can indeed be pressed into openings in the support substrate. However, these do not represent paths from which foam emerges under pressure, as would be the case with previously known methods using closed molds. For this reason, the application of semi-rigid expanded foam also allows the use of support substrates that are perforated or permeable overall, and therefore have a certain permeability. The support substrate can therefore also be composed, for example, of fiber mats, such as glass fiber mats or mats made of natural fibers. In the course of positioning the support substrate relative to the decorative layer, the foam coating can be incorporated into such a support substrate so that it is embedded in the foam. The support substrate is then positively connected to the foam layer after the polymerization process has been completed.

In the method described above, provision can certainly be made for the foam layer to be constructed from two or more individual foam sub-layers, which differ from one another in their density, for example. Each of these foam layers is applied as an expanded foam coating. This does not conflict with the example embodiment described above, in which such a foam layer is formed from individual foam layers and is itself applied to a foam layer, as part of the decorative layer or as part of the support substrate.

BRIEF DESCRIPTION OF THE DRAWINGS

The following disclosure describes example embodiments with reference to the attached figures, wherein.

DETAILED DESCRIPTION

Figure 1:
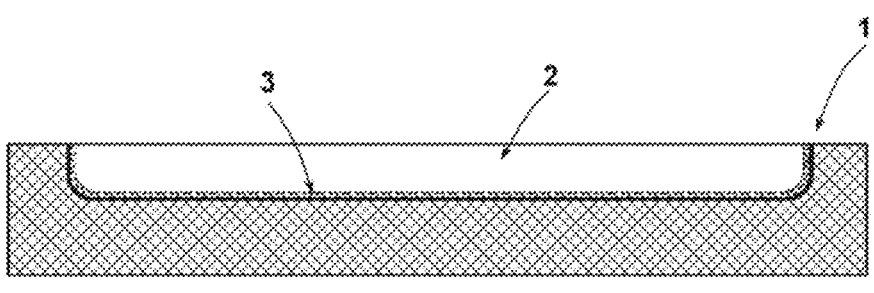
FIG. 1 shows a schematic representation of an open mold for producing a vehicle interior lining part with a decorative layer located therein.
Figure 2:
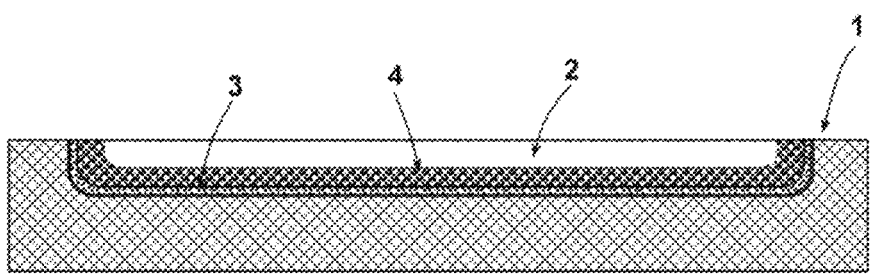
FIG. 2 shows the mold of FIG. 1 with the decorative layer contained therein, back-foamed with an expanded foam coating.
Figure 3A:
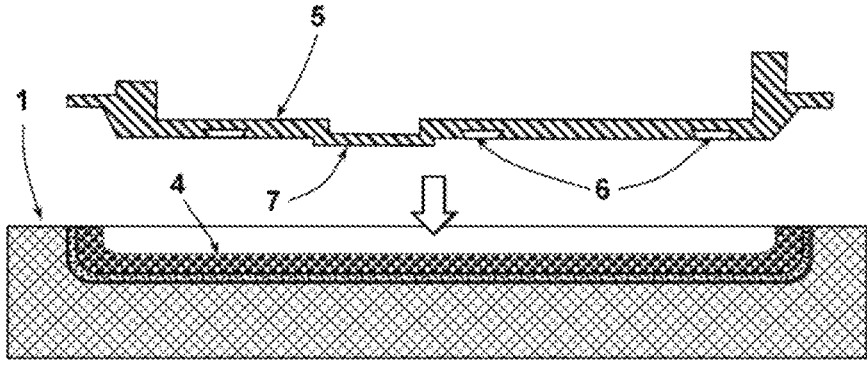
FIGS. 3a and 3b show a support substrate to be positioned on the top of the foam coating (FIG. 3a) and the support substrate positioned on the foam coating (FIG. 3b)
Figure 3B:
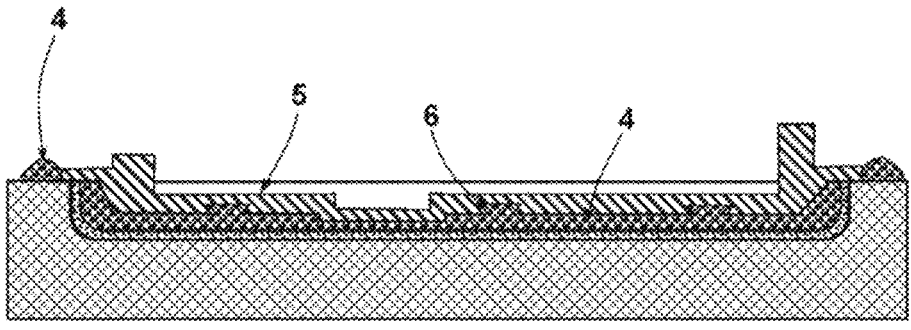

An open mold 1 includes a cavity 2. A decorative layer 3 is arranged in the cavity 2. In the example embodiment shown, the decorative layer 3 is initially formed in the mold 1, specifically in the example embodiment shown by spraying on of a corresponding polyurethane compound. The side of the mold 1 facing the cavity 2 is structured with a leather-like grain, so that the decorative layer 3 has a leather grain on its underside facing in FIG. 1. To form an interior lining part for a vehicle, in the example embodiment shown, a reactive expanded foam raw compound is applied to the rear face of the decorative layer 3 in a subsequent process step, namely by spraying. The droplet size emerging from the spray nozzle is relatively small, for example 0.1 to 1 mm. In the example embodiment shown, the foam coating 4 is expanded polyurethane soft foam. The foam coating is identified in FIG. 2 with the reference number 4. The foam coating in the example embodiment shown is an open-pore flexible polyurethane foam that has been foamed with nitrogen and applied to the decorative layer 3 in the foamed state. Immediately after application of the foam coating 4, i.e. at a time at which the reaction time in relation to its polymerization process has just begun, a support substrate 5 is brought into contact with the top of the foam coating 4 and slightly pressed into it (see FIGS. 3a, 3b). In the example embodiment shown, the support substrate 5 is a rigid ABS plastic part. Pressing the support substrate 5 into the foam coating 4 serves to distribute the foam in the gap (cavity) between the decorative layer 3 and the support substrate 5 and to introduce it into undercut structures of the support substrate 5 facing the decorative layer 3. Such undercut structures are in the support substrate 5, for example in the form of dovetail-shaped undercuts identified by reference number 6. The formation of these undercut structures serves the purpose of connecting the support substrate 5 to the polymerized foam layer not only adhesively, but also in a form-fitting manner. In the example embodiment shown, the support substrate 5 is structured and has a projection 7 which is pressed deeper into the foam coating 4 than the portions adjacent to the projection 7. The flowability or mobility of the foam coating 4 at the time it is brought together with the support substrate 5 is exploited for this purpose.

Figure 4:
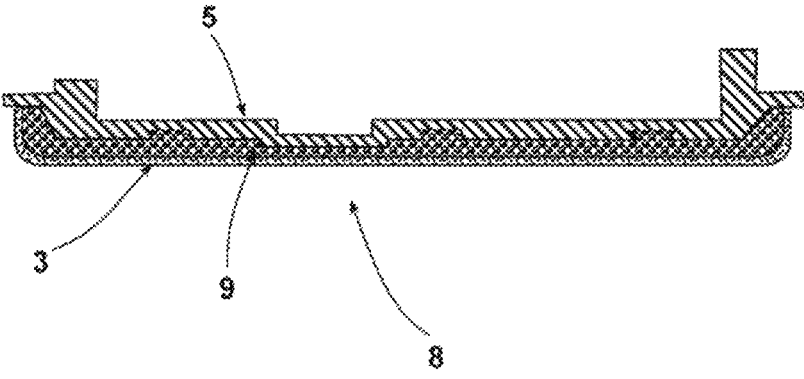
FIG. 4 shows the interior lining part removed from the mold.

The support substrate 5 is pressed into the foam coating 4 until the predefined distance from the decorative layer 3 is established. In the example embodiment shown, the support substrate 5 has stop extensions which rest on the top of the mold 1 when the predefined distance from the decorative layer 3 is reached. The foam coating 4 has been applied with a volume that is larger than the volume of space actually required in order to fill the gap between the decorative layer 3 and the support substrate 5 in the position shown in FIG. 3b. Excess foam is squeezed out of the side of the cavity 2 of the mold (see FIG. 3b). This is accompanied by a certain compression of the foam coating 4, which is easily possible since it is an open-pored foam coating. After positioning the support substrate 5, wait until the polymerization process is completed. Then the finished interior lining part 8 is removed from mold 1, cleaned if necessary and can then be further processed or assembled. The interior lining part 8 is shown in FIG. 4. The polymerized foam layer is identified therein by reference number 9.

Figure 5:
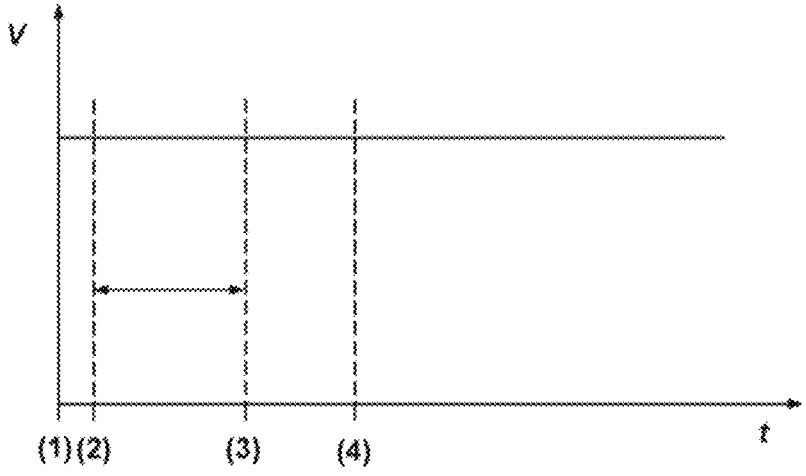
FIG. 5 shows a diagram of the time course of the individual process steps in the production of the interior lining part of FIG. 4.

The chronological sequence of the process steps in relation to the chemical behavior of the expanded foam coating can be seen in the diagram in FIG. 5. In the diagram in FIG. 5, the time is plotted on the x-axis and the foam volume is plotted on the y-axis. Since expanded foam is applied in the method described above, the foam volume remains constant over time. The foam volume does not necessarily change due to the above-described displacement process when positioning the support substrate 5. Nevertheless, it can be provided that when the support substrate 5 is pressed in, a certain compression of the foam coating 4 is brought about, typically by 8-15%. At time (1), the expanded foam has been applied by spraying. The reaction time of the reactive foam begins when the foam is applied. Since the rear face of the decorative layer 3 cannot be sprayed over its entire surface at the same time, the reaction time, distributed at different times over the surface of the rear face of the decorative layer 3, has begun before the support substrate 5 is brought into contact with and positioned on the expanded foam coating at time (2). The time window in which the support substrate 5 is positioned as intended ends at time (3). In the diagram, the tack-free time is reached at time (4). The surface of the foam coating 4 is then no longer sticky. For this reason, the intended time window ends sufficiently before time (4). In the example embodiment shown, the reactive foam coating 4 is adjusted by adding catalysts so that the tack-free time is already reached after about 25 seconds. With this method, a time window of approximately 15 to 20 seconds remains for positioning the support substrate. If the expanded foam coating is set differently, namely in that the reaction time until tack-free time is slightly longer, the time window for positioning the support substrate is correspondingly longer. The time window can thus be set up accordingly. The surface of the rear face of the decorative layer 3 to which the foam coating 4 is to be applied can also influence the dimensioning of this time window. A larger surface requires more time for foam coating.

Figure 6:
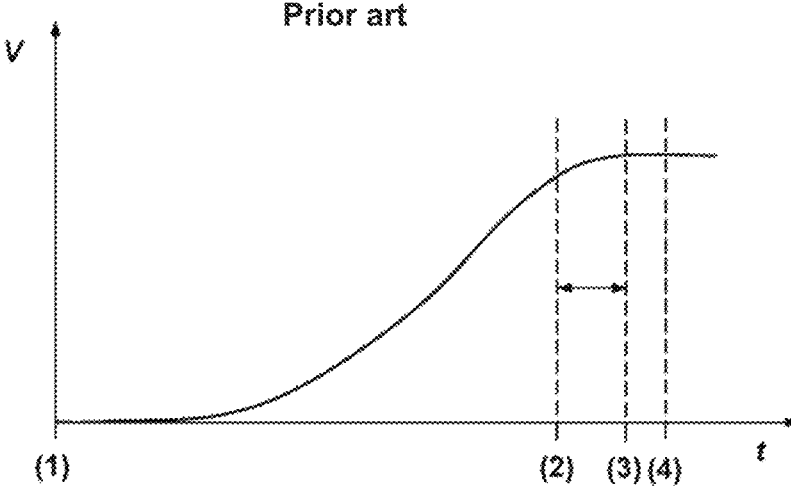
FIG. 6 shows a diagram corresponding to that of FIG. 5 for representing the time course of an interior lining part according to the prior art, also produced in an open mold.

The diagram shown in FIG. 6 shows the process sequence for producing an interior lining part when the reactive, not yet expanded raw compound is applied to the rear face of a decorative layer in an open mold. In order to position the support substrate, the foaming process must first be waited for until it is completely or at least almost completely completed. The point in time (2) is therefore necessarily much later in relation to the reaction time than in the process sequence shown in FIG. 5 for the method according to the disclosure. The time window in which the support substrate is to be positioned (time interval between (2) and (3)) is only very short due to the proximity of the adhesive release time in the largely advanced polymerization process. Positioning the support substrate too early when brought into contact with the foam surface leads to the formation of a harder foam. Positioning the support substrate too late no longer leads to the desired quality of the adhesive bond. Finally, the tack-free time is reached shortly afterwards at time (4). It is possible to shorten the reaction time in this process by using catalysts. However, this also reduces the time window within which the support substrate has to be positioned. Therefore, in this process, the reaction time of the foam-forming raw compound is adjusted so that the time window for positioning the support substrate is sufficiently long.

Figures 7A, 7B, 7C:
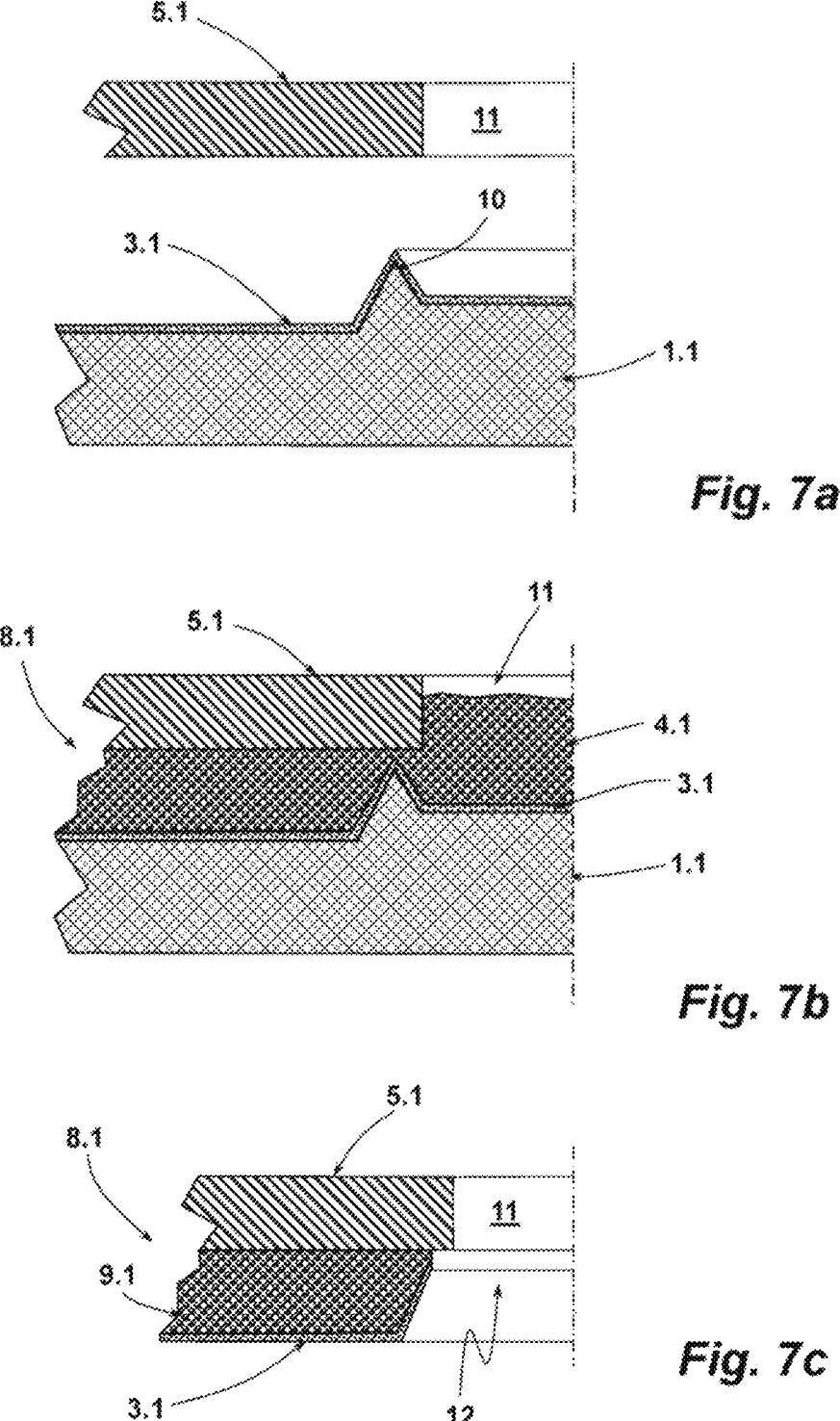
FIGS. 7a, 7b, and 7c show a partial sectional view through the arrangement of an open mold with a support substrate to be positioned, which has a through opening for forming a through opening within the lining part (FIG. 7a), the support substrate positioned opposite the decorative layer with the foam coating interposed (FIG. 7b) and the lining part removed from the mold with the through opening formed therein (FIG. 7c)

FIG. 7a shows a section of a mold 1.1, in which a decorative layer 3.1 has been inserted or formed on the impression surface of the mold 1.1. The mold 1.1 is designed so that the interior lining part to be produced with it can be produced with a through opening, for example for inserting the air outlet panel of an air conditioning system. For this purpose, the mold 1.1 has a projection 10 which provides a weak point in the foam layer to be created. The projection 10 extends circumferentially around the opening to be created and tapers towards the support substrate 5.1. The support substrate 5.1 has an opening 11 in the area of the through opening to be created.

After spraying the rear face of the decorative layer 3.1 with expanded foam to provide a foam coating, the support substrate 5.1 is positioned opposite the decorative layer 3.1. In the area of the projection 10, the distance between the support substrate 5.1 and the decorative layer 3.1 is minimized. This means that the thickness of the foam coating 4.1 in the gap between the projection 10 and the support substrate 5.1 is only very small. For the purpose of connecting the support substrate 5.1 to the decorative layer 3.1, foam is applied between the decorative layer 3.1 and the support substrate 5.1. By positioning the support substrate 5.1 on the foam coating 4.1 (see FIG. 7b), the foam coating has also been pressed into the opening 11. After completion of the polymerization process, a predetermined breaking point is provided, caused by the projection 10, at which the polymerized foam coating—the foam layer 9.1—with the decorative layer 3.1 attached to it is separated in the middle of the opening to be created (indicated by the dashed line), for example by tearing it off. This is typically done after the interior lining part 8.1 has been removed from the mold 1.1. In the opening 12 of the interior lining part 8.1 created in this way (see FIG. 7c), an additional component can then be mounted, which passes through the interior lining part 8.1.

Figure 8A:
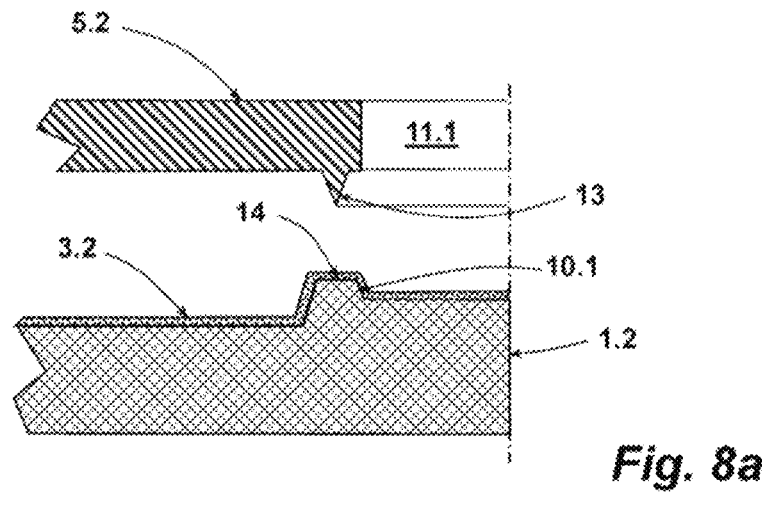
FIGS. 8a, 8b, and 8c show a partial sectional view corresponding to the representations of FIGS. 7a-7c, respectively, with a different embodiment of the through opening design of the inner lining part.
Figure 8B:
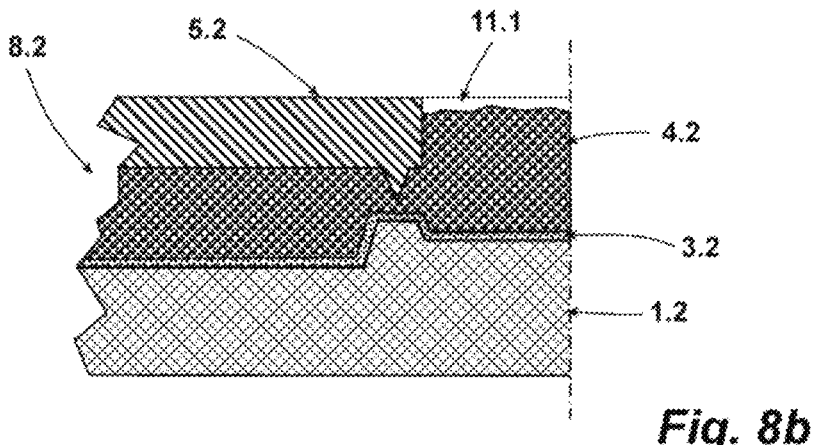
Figure 8C:
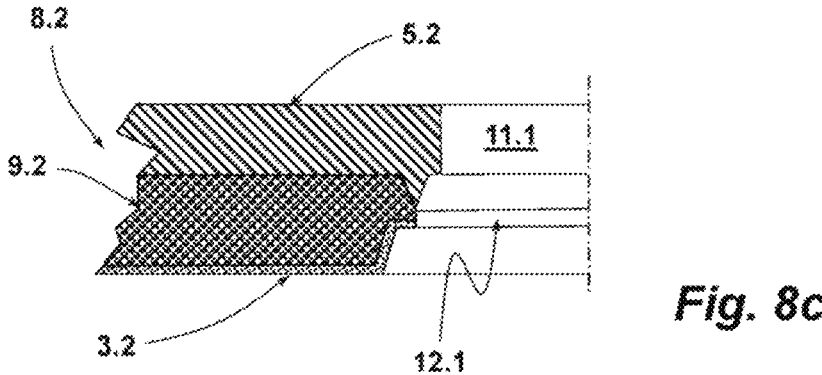

FIG. 8a shows an embodiment of the components corresponding to the example embodiment of FIGS. 7a-7c, wherein the support substrate 5.2 carries a projection 13 with a tip pointing towards the mold 1.2 in the example embodiment of FIG. 8a. In the example embodiment shown in FIGS. 8a, 8b, the mold 1.2 also carries a projection 10.1, which, however, has a plateau 14 in contrast to the projection 10 of the mold 1.1, which tapers towards the support substrate 5.1. The interior lining part 8.2 is produced with the mold 1.2 in the same way as described above for the example embodiment of FIGS. 7a-7c. After the polymerization of the foam coating 4.2, whereby the foam layer 9.2 has been provided, the polymerized foam is separated from the region of the through opening 12.1 to be created with the decorative layer 3.2 adhering to it to release the through opening 12.1.

The invention has been described on the basis of example embodiments. Without departing the scope of the claims, numerous further options and possibilities result to a person skilled in the art for implementing the invention, without having to explain or show them in greater detail in the context of this disclosure.

LIST OF REFERENCE NUMERALS

1, 1.1, 1.2 mold
   2 cavity
3, 3.1, 3.2 decorative layer
4, 4.1, 4.2 foam coating
5, 5.1, 5.2 support substrate
   6 undercut structure
   7 projection
8, 8.1, 8.2 interior lining part
9, 9.1, 9.2 foam layer
   10, 10.1 projection
   11, 11.1 opening
   12, 12.1 breakthrough
     13 projection
     14 plateau

The invention claimed is:

1. A method for producing a lining part comprising a support substrate, a flexible decorative layer, and a foam layer, wherein the support substrate is positioned opposite the decorative layer with the foam layer therebetween, the method comprising:

applying the foam layer as an expanded foam layer, foamed with a gas as a physical blowing agent, onto a back side of the decorative layer and/or onto a side of the support substrate facing the decorative layer; and as long as the expanded foam layer is still flowable, positioning the support substrate at a defined distance from the back side of the decorative layer with interposition of the expanded foam layer, whereby, during the process of positioning the support substrate, at least a part of the expanded foam layer between the decorative layer and the support substrate is displaced and is plastically compressed, so that the decorative layer is bonded to the support substrate by the expanded foam layer, then holding the support substrate at its defined distance to the back side of the decorative layer until the cross-linking process of the expanded foam layer is at least mostly completed.

2. The method of claim 1, wherein the support substrate is positioned relative to the decorative layer in a reaction time interval when 70% of the reaction time of the cross-linking process has not yet been exceeded.

3. The method of claim 1, wherein the support substrate is positioned relative to the decorative layer in a reaction time interval when 50% of the reaction time of the cross-linking process has not yet been exceeded.

4. The method of claim 1, wherein the expanded foam layer is applied with a volume that is larger than required for filling the gap between the decorative layer and the support substrate.

5. The method of claim 1, wherein the support substrate is moved relative to its distance from the decorative layer and relative to a position thereof in relation to the planar extension of the decorative layer with respect to the expanded foam layer applied thereto, before holding the support substrate until the cross-linking process of the expanded foam layer is at least mostly completed.

6. The method of claim 1, wherein the support substrate is positioned relative to the back side of the decorative layer with spacers or a positioning caliber, on which the support substrate is positioned at the defined distance of the support substrate to the back side of the decorative layer.

7. The method of claim 1, wherein the process steps are carried out in an open mold, and in a first step the decorative layer is inserted into the open mold or produced therein and the further steps then follow in the open mold.

8. The method of claim 1, wherein the expanded foam layer is applied by spraying.

9. The method of claim 1, wherein a reactive foamed expanded polyurethane foam raw material is applied to form a soft polyurethane foam or a semi-rigid polyurethane foam as the expanded foam layer.

10. The method of claim 9, wherein nitrogen is used as the blowing agent for foaming the foam raw material.

11. The method of claim 9, wherein polyol and isocyanate components are mixed to produce a reaction mass for producing the foam raw material, and the blowing agent is introduced into the reaction mass before and/or during the mixing process or into the polyol component and/or the isocyanate component used to produce the reaction mass.

12. The method of claim 9, wherein the foam raw material to be applied and foamed by the blowing agent is anhydrous or at least mostly anhydrous.

13. The method of claim 1, wherein the support substrate has at least one opening, and the lining part is produced with a predetermined breaking point to create an opening through the lining part.

14. The method of claim 1, wherein the support substrate is permeable for the expanded foam layer, and wherein foam material of the expanded foam layer is introduced into the support substrate by the positioning of the support substrate relative to the decorative layer with interposition of the expanded foam layer.

15. The method of claim 14, wherein a fiber mat is used as the support substrate.

16. A lining part comprising a support substrate, a flexible decorative layer, and a foam layer therebetween, the lining part produced according to the method of claim 1, wherein the lining part has a homogeneous hardness with respect to the foam layer over a planar extension thereof regardless of possible varying gap dimensions being present between the decorative layer and the support substrate.

17. The lining part of claim 16, wherein the foam layer is formed by an expanded polyurethane foam.

18. The lining part of claim 16, wherein the lining part has at least one opening.

19. The lining part of claim 16, further comprising a second foam layer arranged between the first foam layer and the decorative layer and/or the support substrate, which has a different hardness compared to the first foam layer.

20. The lining part of claim 16, wherein the lining part is an interior lining part for a vehicle.

* * * * *